US007882865B2

(12) United States Patent
Denis

(10) Patent No.: US 7,882,865 B2
(45) Date of Patent: Feb. 8, 2011

(54) BOOM UNIT

(76) Inventor: Laurent Denis, 123 Du Marché, Roxton Falls, Québec (CA) J0H 1E0

( * ) Notice: Subject to any disclaimer, the term of this patent is extended or adjusted under 35 U.S.C. 154(b) by 661 days.

(21) Appl. No.: 11/523,448

(22) Filed: Sep. 20, 2006

(65) Prior Publication Data

US 2008/0066828 A1    Mar. 20, 2008

(51) Int. Cl.
*A01G 23/08* (2006.01)
(52) U.S. Cl. ............. 144/34.2; 144/2.1; 144/3.1; 144/34.1; 414/722; 212/350
(58) Field of Classification Search ............ 144/4.1, 144/24.13, 41, 48.3, 43; 414/722; 212/350
See application file for complete search history.

(56) References Cited

U.S. PATENT DOCUMENTS 3,735,786 A * 5/1973 Vit ..................... 144/24.13

5,586,426 A * 12/1996 Warkentine ............... 56/327.1
2002/0020760 A1 * 2/2002 Beggs ..................... 239/166

FOREIGN PATENT DOCUMENTS

CA    1126627 A * 6/1982 ............. 144/33

* cited by examiner

*Primary Examiner*—Dana Ross
*Assistant Examiner*—Matthew G Katcoff

(57) ABSTRACT

A boom unit for a tree processing machine having a boom with a square cross-section. The boom unit has a boom support with a front boom mounting at the front end of the support and a rear boom mounting at the rear end of the support. The boom is movably mounted through the front and rear boom mountings and is positioned to have a corner of the boom on the bottom and an opposite corner of the boom on the top directly over the bottom corner. The front mounting has a pair of front, bottom rollers arranged in a v shape to cradle the boom with the bottom corner of the boom between the rollers and a single, top, guide member above the bottom rollers and centered with respect to the bottom rollers to ride on the top corner of the boom to hold the boom against the bottom rollers.

17 Claims, 4 Drawing Sheets

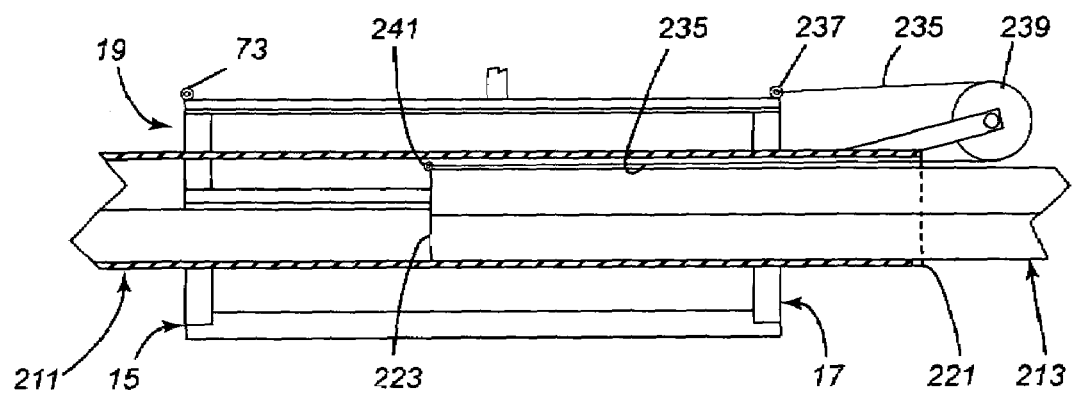
FIG. 7
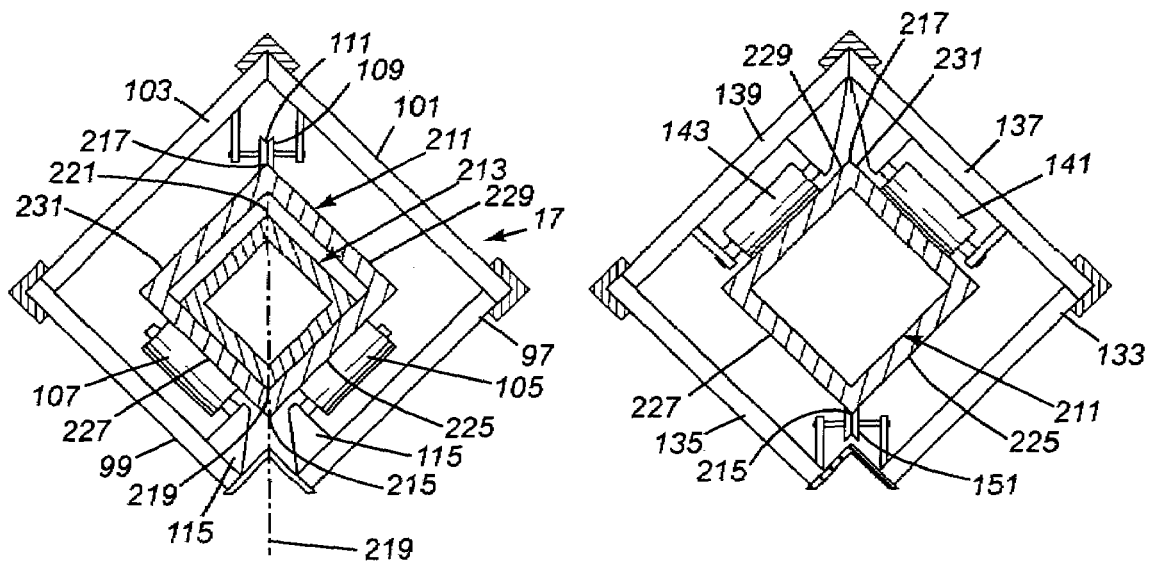
FIG. 8          FIG. 9

BOOM UNIT

BACKGROUND OF THE INVENTION

1. Field of the Invention

This invention is directed toward a boom unit used in a tree processor.

2. Description of the Related Art

Boom units for tree processors, such as delimbers, are known. The boom unit has a boom movably mounted through a tubular support, the support rotatably and pivotably mountable on a vehicle. The boom is movable through the support to first grip and to then lift and move a cut tree to be held by the support at its cut end. The boom is then moved relative to the support and the held tree to delimb it. The boom is normally rectangular in cross-section with a height greater than its width. The boom rests on a flat, bottom side in the tubular support, the bottom side horizontal. There are boom support means on the support, usually in the form of top, bottom, and side rollers at both ends of the support, between which the boom moves. The top and bottom rollers minimize up and down movement of the boom while the side rollers minimize sideways movement of the boom. Boom moving means, usually in the form of a chain and sprocket drive with the chain mounted on top of the boom, and the sprocket mounted on the support, move the boom forwardly and rearwardly through the support.

The mounting of the boom in the above manner however results in high maintenance of the unit. The boom, because of the nature of the work, is constantly being forced against the rollers with sideways forces and sudden up and down forces when a tree is gripped and lifted by the boom or when a tree is released by the boom. Each bottom roller is unequally stressed when the boom is forced against either side during use leading to rapid wear and replacement of the bottom rollers. In addition, the chain and sprocket drive used to move the boom through the support is constantly stressed due to lateral movement of the boom and the attached chain relative to the support and attached sprocket and also requires frequent maintenance and replacement.

In an effort to reduce maintenance, it is known to provide a boom unit having a boom with a square cross-section, the boom mounted through a tubular support and movable through the support in either direction. The support supports the boom with opposed corners of the boom on a vertical center line so that one corner of the boom is at the bottom center of the boom. Such a boom is shown in U.S. Pat. No. 3,735,786 issued May 29, 1973 to Rudy Vit. The support is constructed with four walls defining a tube with a square cross-section and positioned to support the boom with a boom corner at the bottom. Rollers are mounted in all four walls of the support at its front and rear ends to movably support the boom for movement through the support and to minimize movement of the boom both up and down and sideways in the support. The mounting the boom on a corner, rather than on a side, centers the boom on the two bottom rollers at the front and rear of the support. When the boom is extended relative to the support and picks up a tree, the load is transferred to the bottom, front rollers and the top, rear rollers of the support. Mounting the boom in the above manner, where it is cradled between the bottom rollers, equalizes the load between the bottom rollers and reduces maintenance compared to the maintenance required by booms with a rectangular cross-section mounted on a narrow side.

However, the arrangement of using a boom with a square cross-section, the boom mounted on a corner, still requires frequent maintenance. The system uses a relatively large number of rollers all of which require servicing. The front, top and rear, bottom rollers, while not load bearing to the same extent as the front, bottom and rear, top rollers, are unequally affected by sideways and up and down movements of the boom during use. Also, all the rollers are each mounted with a pin supported by bushings and roller bearings at each end. Replacement of any roller and/or the bearings is difficult. In addition, a drive means other than a chain and sprocket drive is required to move a boom mounted on a corner and the different drive means used is quite complicated.

BRIEF SUMMARY OF THE INVENTION

It is the purpose of the present invention to provide a boom unit for a tree processor having a boom support, and a boom of square cross-section movable through the support and supported thereby with two opposed corners of the boom on a vertical center line of the boom, which unit is simpler in construction, holds the boom more securely, and is easier to maintain and service. It is another purpose of the present invention to provide a boom unit as described with boom moving means for moving the boom relative to the boom support which moving means are simple in construction, easy to service, and reliable in use.

In accordance with the present invention a boom unit for a tree processor is provided with a boom having a square cross section. The boom is mounted through a boom support with two opposed corners of the boom on a central vertical line and one of the opposed corners at the bottom of the support. In accordance with the present invention, the boom support has a frame carrying front and rear boom mounting means thereon. The front boom mounting means has a pair of front, bottom rollers mounted on the front of a frame, and the rear boom mounting means has a pair of rear, top rollers mounted on the rear of the frame. The front rollers are arranged to form a v-shaped support for the boom supporting the boom by its two bottom sides. The rear rollers form an inverted v-shape support for receiving the two top sides of the boom. The frame also supports a top, front guide member, as part of the front boom mounting means, overlying the bottom, front rollers. The top, front guide member bears on the top corner of the boom. The frame further carries a bottom, rear guide member, forming a part of the rear boom mounting means, under the top, rear rollers for supporting the boom by its bottom corner. The front bottom and rear top rollers hold the boom securely against lateral movement while the front, top and rear bottom guide members co-operate with the front and rear rollers to hold the boom against any vertical backlash during operation. The mounting arrangement more securely holds the boom during its operation against vertical and lateral movement using fewer moving parts than known arrangements.

In accordance with the present invention, the front, bottom and rear top rollers are mounted on cantilevered spindles. The spindles allow the use of tapered bearings and a simple nut and washer connection to hold the rollers in place on the spindles. The rollers and/or the bearings can be easily replaced using a spindle mounting.

The present invention also provides a simple boom moving means for moving the boom relative to the boom support. The boom moving means can comprise a cable for moving the boom. The cable is generally mounted above the boom with the ends of the cable attached to the boom support, the cable passing over cable guide means at the ends of the boom. The cable passes through a cable drive mounted on the boom support.

The invention is particularly directed toward a boom unit for a tree processing machine, the boom unit having a boom with a square cross-section and a boom support for the boom. Front and rear boom mounting means are provided at the front and rear ends of the boom support. The boom is movably mounted through the boom mounting means, the boom positioned to have two opposed corners on a vertical center line with one of the opposed corners at the bottom of the boom. The front boom mounting means has a pair of front, bottom rollers in a v-shape to cradle the boom and a single, front, top guide member above the bottom rollers and centered with respect to the bottom rollers to ride on the top corner of the boom to hold the boom against the bottom rollers.

The invention is also particularly directed toward a boom unit for a tree processing machine having a boom with a square cross-section and a boom support for the boom. Boom mounting means are provided at the front and rear ends of the boom support. The boom is movably mounted through the boom mounting means, the boom positioned to have two opposed corners on a vertical center line with one of the opposed corners at the bottom of the boom. Boom moving means are provided for moving the boom relative to the boom support. The boom moving means has a cable generally mounted above the boom with the ends of the cable attached to the boom support, the cable passing over cable guide means at the ends of the boom. The cable passes above the boom support through a cable drive mounted on the boom support.

BRIEF DESCRIPTION OF THE SEVERAL VIEWS OF THE DRAWINGS

FIG. 7 is a partial cutaway detail side view of the boom unit in FIG. 6 showing the second cable connection;

FIG. 8 is a cross-section view taken along line 8-8 in FIG. 6, but without showing the cable drive; and FIG. 9 is a cross-section view taken along line 9-9 in FIG. 6.

DETAILED DESCRIPTION OF THE INVENTION

Figure 1:
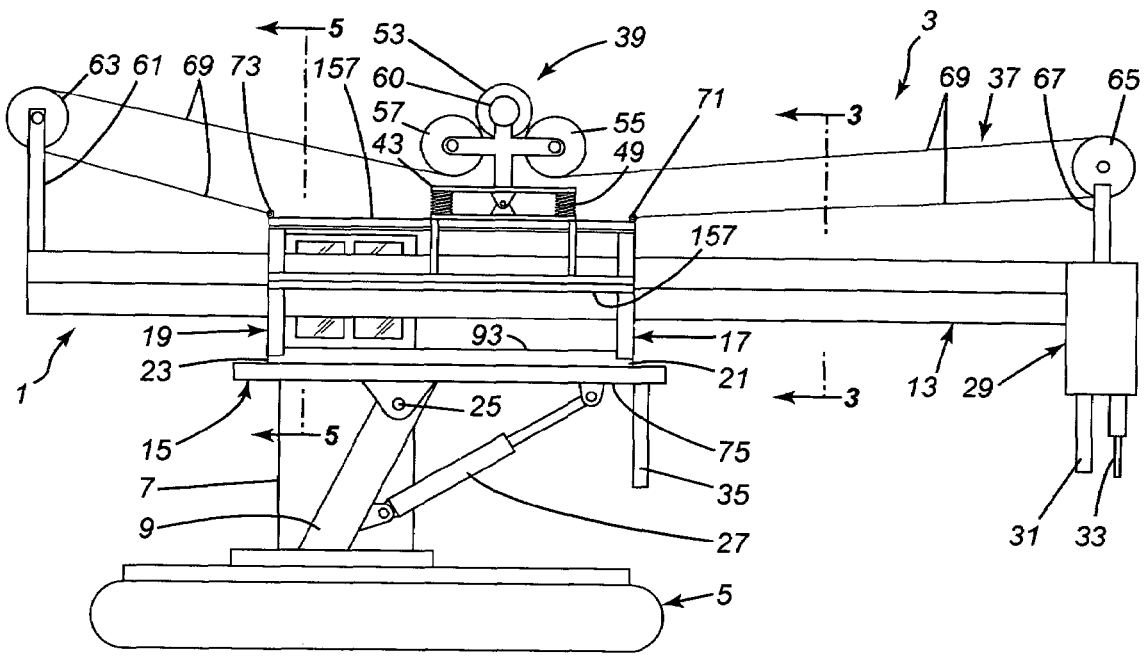
FIG. 1 is a side view of a tree processor carrying the boom unit.

The boom unit 1 of the present invention, as shown in FIG. 1, is usually employed on a tree processor such as a delimber 3. The delimber 3 has a vehicle 5 with a cab 7 and a rigid, vertical extending, boom unit support arm 9. The support arm 9, and cab 7, are mounted for rotation about a vertical axis on the vehicle 5. The support arm 9 has the boom unit 1 at its top end. The boom unit 1 comprises an elongate boom 13 and a boom support 15. The boom support 15 has front and back boom mounting means 17, 19 at its front and back ends 21, 23 through which the boom 13 is mounted for movement relative to the support 15. The boom unit 1 is mounted on the end of the support arm 9 by a horizontal pivot 25 connecting the support arm 9 and the support 15. A hydraulic cylinder 27 is pivotably mounted between the support arm 9 and the support 15 to tilt or pivot the boom unit 1 relative to the support arm 9 about the pivot 25.

The boom 13 has a tree processing head 29 at its front end. The tree processing head 29 carries tree gripping means 31, and tree cutting means 33, if needed. Tree gripping means 35 are mounted on the boom support 15 at its front, bottom end, the gripping means 35 aligned with the tree gripping means 31 on the head 29 on the boom 13. The boom 13 grasps a cut tree with its gripping means 31 and positions the butt end of the cut tree in the tree gripping means 35 on the support 15. The boom is then moved to have its gripping means 31 delimb the held tree while supporting it.

Figure 2:
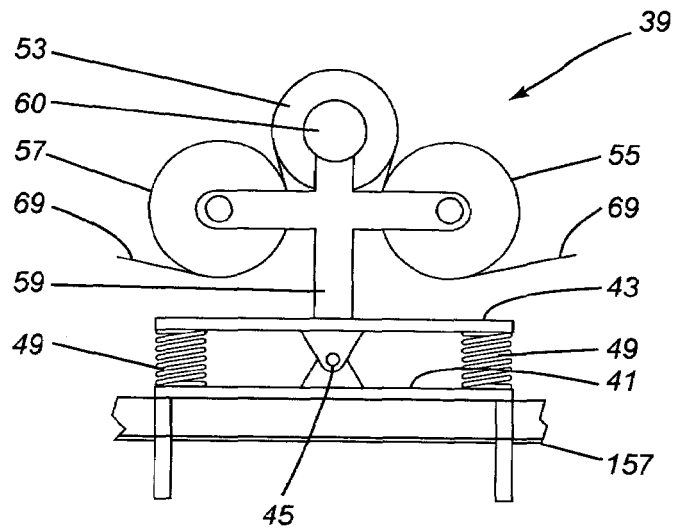
FIG. 2 is a detail side view of the cable drive.

Boom moving means 37 are carried by the boom unit 1. The boom moving means 37 include a cable drive 39 mounted on top of the support 15. The cable drive 39, as shown in detail in FIGS. 2 and 3, has a fixed, generally rectangular, platform 41 on top of the support 15. A movable, generally rectangular, platform 43 is pivotably mounted at about the middle of its long sides, via pivots 45, on the fixed platform 41, the movable platform 43 generally overlying the fixed platform 41. The pivot axis of the pivots 45 is transverse to the boom 13. Shock absorbing means 49 in the form of springs, or other suitable cushioning means, are mounted between the fixed platform 41 and the movable platform 43 at the front and the rear of the platforms. The cable drive 39 has a drive pulley 53 and first and second central guide pulleys 55, 57 one on each side, and adjacent to, the drive pulley 53, mounted between support brackets 59 on the movable platform 43. The cable drive includes a radial piston type hydraulic motor 60 to selectively rotate the drive pulley 53 in either direction.

The boom moving means 37 includes a rear support post 61 mounted on the back of the boom 13, the post 61 carrying a rear guide pulley 63. A front guide pulley 65 is attached a front support post 67 on the top front of the boom 13. A drive cable 69 moves the boom 13 relative to the support 15. The drive cable 69 is attached at one end to the front end 21 of the support 15 as shown at 71 and extends forwardly from the support 15, under and over the front guide pulley 65 and back to the cable drive 39. The cable 69 passes under the first central guide pulley 55, over and around the drive pulley 53, and under the second central guide pulley 57, back over the rear guide pulley 63 and to the back end 23 of the support 15 where its other end is attached as shown at 73. Rotation of the drive pulley 53 in either direction by the motor 60 will move the boom 13 in either direction relative to the support 15 via the cable 69. The central guide pulleys 55, 57 hold the cable 69 frictionally tight about the drive pulley 53 to have the drive pulley 53 move the cable 69 in either direction as it rotates in either direction. The shock absorbing means 49 between the fixed platform 41 and the movable platform 43 absorb any backlash from the cable 69 when the boom 13 is stopped moving in either direction thereby extending the life of the cable 69.

Figure 3:
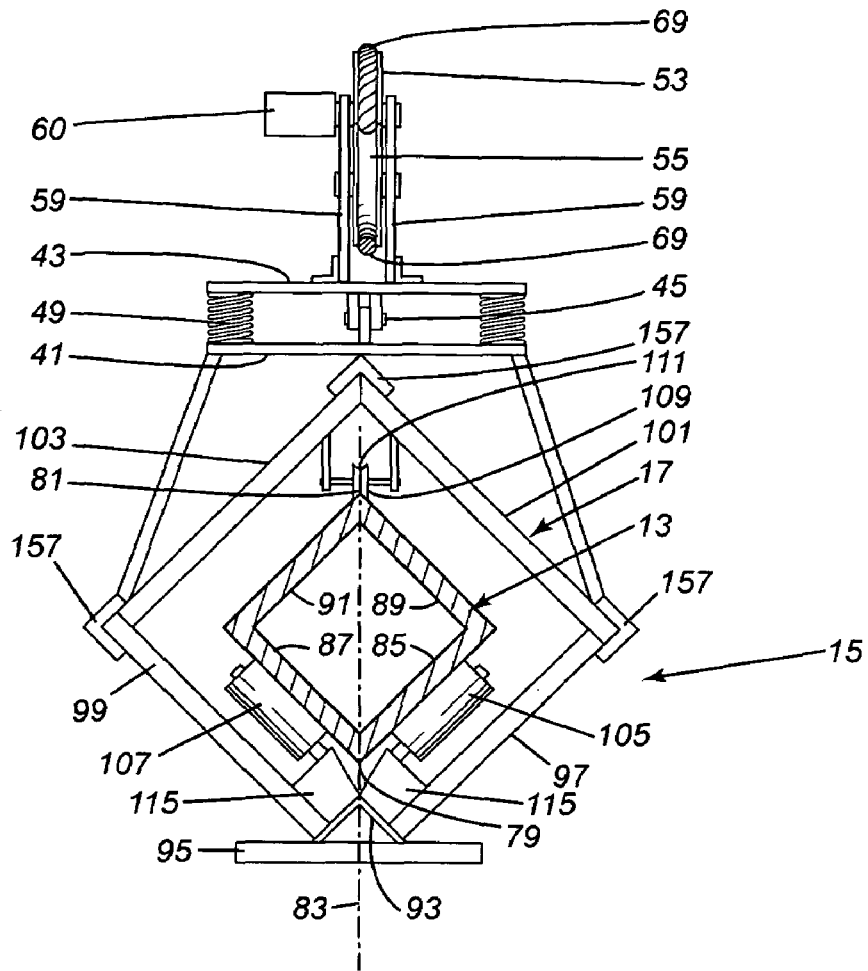
FIG. 3 is a cross-section view taken along line 3-3 in FIG. 1.

The boom 13 has a square cross-section and is mounted on the support 15 with one corner 79 on the bottom and the opposite corner 81 on the top, as shown in FIG. 3, the corners aligned on the vertical center line 83 of the boom 13. The bottom corner 79 is formed by the joint between the two adjacent bottom walls 85, 87 of the boom and the top corner 81 is formed by the joint between the two adjacent top walls 89, 91 of the boom.

The support 15 has a main bottom frame 93 which frame can be in the form of a length of inverted angle iron. The frame 93 is connected to a base 95 to which the support arm 9, the hydraulic cylinder 27 and the tree gripping means 35 are attached. The front boom mounting means 17, shown in FIGS. 1 and 3, is mounted at the front of the frame 93 and has a pair of front, main, support arms 97, 99 extending upwardly and outwardly from the bottom frame 93 away from each other. The main support arms 97, 99 are at 90° to each other, each arm at 45° to the vertical. A pair of front, secondary, support arms 101, 103 extend transversely from the outer ends of the main support arms 97, 99 upwardly and inwardly toward each other to join above the center of the bottom frame 93. The secondary support arms 101, 103 are also at 90° to each other. A pair of front, bottom, rollers 105, 107 are mounted on the inside of the main support arms 97, 99. The rollers 105, 107 extend at 90° to each other and form a 'v'. A front, top, guide member 109 is mounted from the secondary support arms 101, 103, to be centrally located over the frame 93. The guide member 109 can comprise a wheel rotatable about a horizontal axis which axis is transverse to the longitudinal axis of the frame 93. The periphery of the wheel 109 has a v-shaped groove 111 to receive the top corner 81 of the boom 13.

Figure 4:
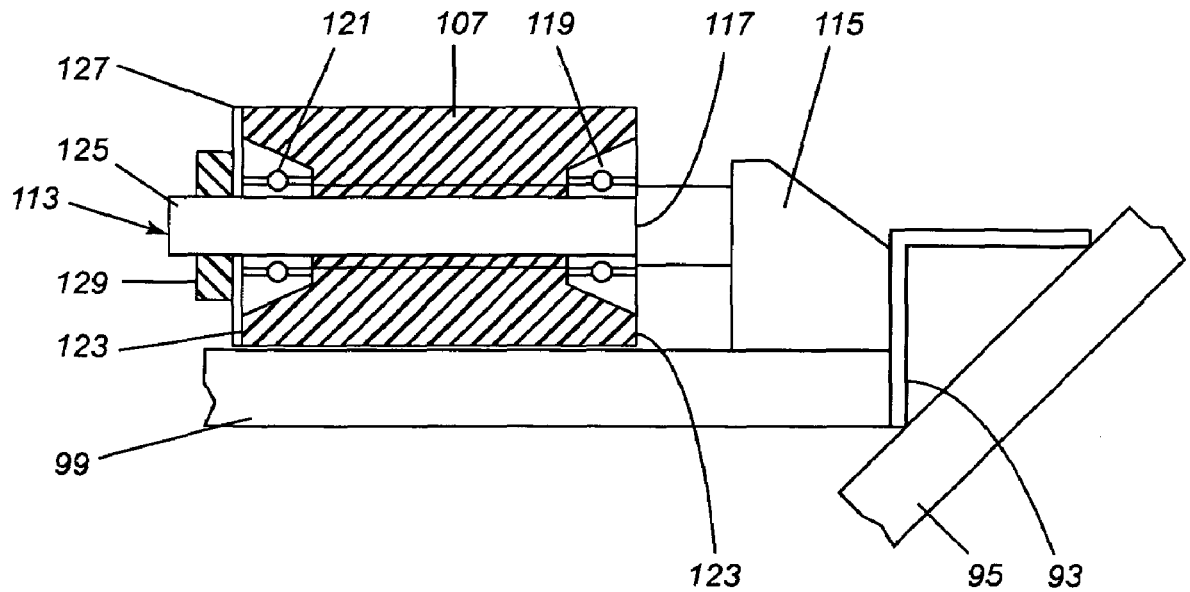
FIG. 4 is a cross-section view of a support roller mounted on a spindle.

In more detail, as shown in FIG. 4, the bottom rollers 105, 107 are each mounted in cantilever fashion on the main support arms 97, 99. Since the mounting for both rollers is the same only one will be described in detail. Roller 107 is mounted on a spindle 113, which in turn is mounted at one end to a bracket 115 on support arm 99 near its bottom end. The spindle 113 extends upwardly and outwardly from the bracket 115 parallel to the support arm 99 but a bit above it. The spindle 113 is stepped adjacent to the bracket 115 as shown at 117 and receives the tubular roller 107 thereon. The roller 107 carries tapered bearings 119, 121 at each end 123. The ends 123 of the roller 105 are tapered to receive and position the bearings 119, 121. The lower bearing 119 bears against the step 117 on the spindle 113 to locate the bearings and roller on the spindle. The end 125 of the spindle 113 projecting from the roller 105 is threaded and a washer 127 and nut 129 are attached to the threaded end 125 of the spindle 113 to hold the roller 105 and bearings 119, 121 in place. It will be seen that the roller 105 and the tapered bearings 119, 121 can be easily removed and replaced due to the cantilevered mounting.

Figure 5:
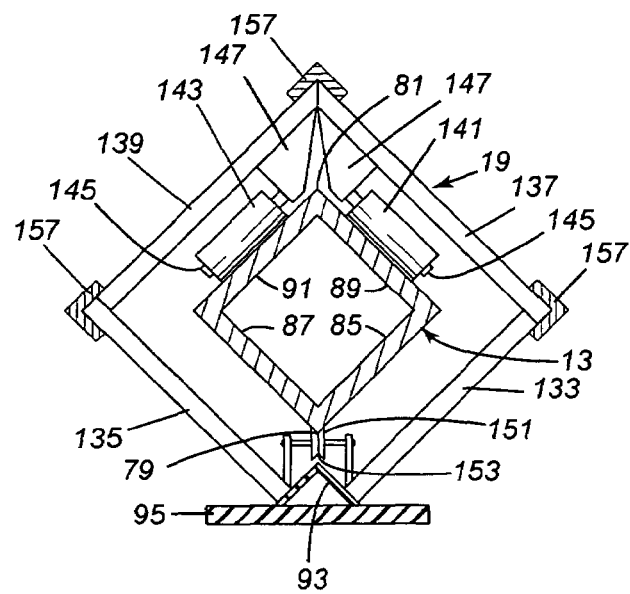
FIG. 5 is a cross-section view taken along line 5-5 in FIG. 1.
Figure 6:
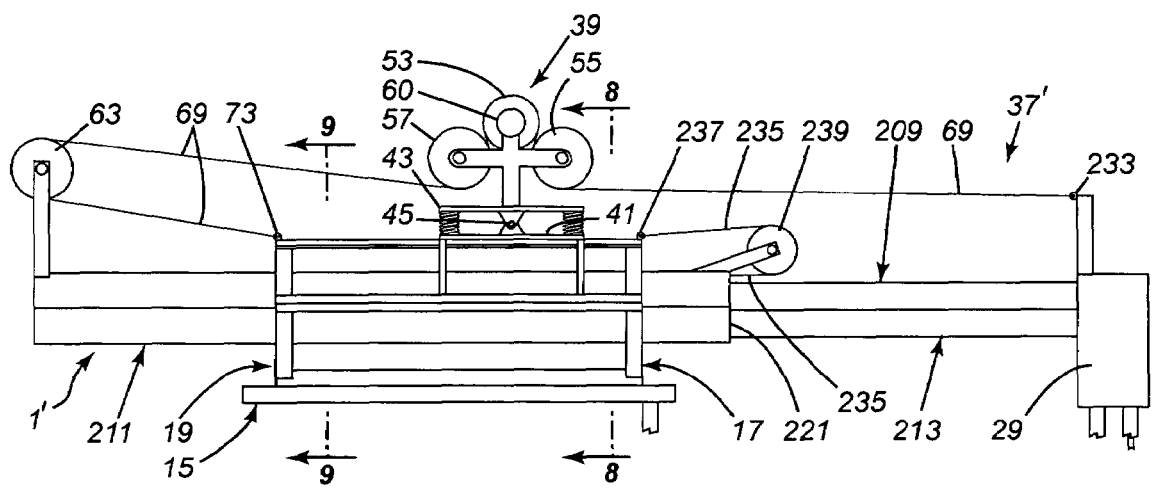
FIG. 6 is a side view of a modified boom unit.

The rear boom mounting means 19, as shown in FIGS. 1 and 5, are at the rear of the frame 93 and comprise a pair of rear, main, support arms 133, 135 extending outwardly and upwardly from the bottom frame 93 away from each other. The rear, main support arms 133, 135 are at 90° to each other, each arm at 45° to the vertical. A pair of rear, secondary, support arms 137, 139 extend transversely from the ends of the rear, main, support arms 133, 135 upwardly and inwardly to be joined at the top over the main frame 93. The rear, secondary support arms 137,;139 are also at 90° to each other. A pair of rear, top, rollers 141, 143 are mounted on the secondary rear support arms 137, 139, the rollers extending at 90° to each other and forming an inverted 'v'. The rollers 141, 143 are mounted in cantilevered fashion on spindles 145 connected at one end to rackets 147, which are in turn mounted to the secondary support arms 137, 139. The rollers 141, 143 are mounted on the spindles 145 in the same manner that the front bottom rollers are mounted on the spindles. A rear, bottom, guide member 151 is mounted over the center of the frame 93. The guide member 151 can comprise a wheel rotatable about a horizontal axis which axis is transverse to the longitudinal axis of the frame 93. The rear guide wheel 151 also has a v-shaped groove 153 on its periphery to receive the bottom corner 79 of the boom 13.

The front and rear boom mounting means 17, 19 are dimensioned to have the boom 13 pass through them securely held against lateral movement between the rollers 105, 107 and guide wheel 109 at the front boom mounting means 17, and the rollers 141, 143 and guide wheel 151 at the rear mounting means 19, while allowing the boom to move longitudinally relative to the support 15. The front mounting means 17 supports the boom 13, via its bottom walls 85, 87 resting on the front, bottom rollers 105, 107 with the front, top guide wheel 109 riding on the top corner 81 of the boom. The rear mounting means 19 supports the boom 13 with the bottom corner 79 of the boom 13 riding on the rear, bottom, guide wheel 151 and the rear, top, rollers 141, 143 riding on the top walls 89, 91 of the boom.

The boom mounting means are simple yet provide good support for the boom. When the boom 13 picks up a tree, the boom is forced down against the front mounting means 17 to bear equally against the front bottom rollers 105, 107, centering the boom against the rollers. Equal weight is placed on both rollers resulting in equal wear. The front, top, guide wheel 109 prevents the boom 13 from moving up away from the front, bottom rollers 105, 107. While the boom is forced down against the front mounting means, its rear portion is forced up against the rear mounting means 19 to bear equally against the rear top rollers 141, 143 again resulting in equal wear on the rear rollers. The bottom corner 79 of the boom is centered on the rear, bottom, guide wheel 151 maintaining the boom against the rear rollers 141, 143 to center its top corner 81 between the rollers. The mounting means 17, 19 together prevent top and sideways movement of the boom during operation. If needed, the top and bottom guide wheels 109, 151 can be adjustably mounted on the support to allow the guide wheels to be adjusted toward or away from their respective bottom and top rollers so as to firmly hold the boom while still allowing it free movement through the support 15.

The design of the boom mounting means allows the rollers and wheels to be easily serviced and replaced. The design also better controls backlash movement of the boom both laterally and vertically during operation thus increasing the life of the boom mounting means. Having the boom guiding rollers angled allows the use of tapered bearings for mounting the rollers, which in turn makes replacement of the bearings easier. In the standard arrangement, where a boom of rectangular cross-section rides on a bottom wall, the bearings are press fit roller bearings and replacement is more difficult. The roller mounting of this invention, cantilevered on a spindle, allows the use of tapered bearings making installation and replacement of the bearings much easier. The mounting also allows the bearings to operate in a bath of oil or grease increasing the life of the bearings.

The support 15 is reinforced with horizontal framing members 157 extending between the outer ends of the front, main, support arms 97, 99 and rear, main, support arms 133, 135 and between the outer ends of the front secondary support arms 101, 103 and the rear secondary support arms 137, 139. The support 15 can be enclosed if desired with panel members (not shown) mounted on the framing members 157 and the bottom frame member 73 forming a tubular support. The ends of the support 15 are left open allowing the boom to pass through the support and more particularly through the front and rear boom mounting means 17, 19. The cable drive 39 is mounted on the horizontal framing members 157 via the fixed platform 41.

The boom unit 1 has been described with a boom 13 consisting of a single boom member. The boom unit 1 could also have a telescopic boom 209 having an outer boom member 211 and an inner boom member 213 telescoped within the outer boom member 211 as shown in FIGS. 6 to 9. Both boom members 211, 213 have a square cross-section and are positioned within the support 15 on the boom unit 1 with the outer boom member 211 having a bottom corner 215 and an opposed top corner 217 on a vertical center line 219 of the boom 209 as shown in FIG. 8. The inner boom member 213 also has a bottom corner 219 and an opposed top corner 221 on the vertical center line 219, the bottom corner 219 of the inner boom member 213 adjacent the bottom corner 215 of the outer boom member 211. The inner boom member 213 can move relative to the outer boom member 211 to lengthen or shorten the boom 209. Rollers (not shown) could be provided at the outer end 221 of the outer boom member 211 and at the inner end 223 of the inner boom member 213 to allow the boom members to move more freely relative to one another.

The outer boom member 211 is mounted through the support 15, its bottom walls 225, 227, bearing against the bottom rollers 105, 107 of the front boom mounting means 17 and its top walls 229, 231 bearing against the top rollers 141, 143 of the rear boom mounting means 19. The bottom corner 215 of the outer boom member 211 rides on the rear, bottom, guide wheel 151 while its top corner 217 rides against the top, front, guide wheel 109.

Using a telescopic boom 209, the boom moving means 37' would be modified to have the front guide pulley eliminated and to use a second cable. The front end of the first cable 69 is now attached at 233 to the processing head 29 which head is now carried by the inner boom member 213 at its front end. The first cable 69, as before, extends back to the cable drive 39. The cable 69 passes over the first central guide pulley 55, under and around the drive pulley 53, up and over the rear central guide pulley 57, back over the rear guide pulley 63 and to the back end 23 of the support 15 where its other end is attached as shown at 73.

A second cable 235 is attached to the front end of the support 15 as shown at 237 and extends forwardly to pass over a guide pulley 239 attached to the front end 221 of the outer boom member 211 and back to be attached at 241 to the rear end 223 of the inner boom member 213 as shown in FIG. 7. The arrangement allows the first cable 69 to pull the inner boom member 213, and thus the processing head 29, rearwardly. As this happens, the second cable 235 pulls the outer boom member 211 rearwardly. When the cable 69 is pulled in the other direction, the movement of the outer boom member 211 forwardly causes second cable 235 to pull the inner boom member 213 forwardly relative to the outer boom member 211.

The invention claimed is

1. A boom unit for a tree processing machine having: a boom with a square cross-section; a boom support in the form of a straight sleeve; front boom mounting means at the front end of the sleeve and rear boom mounting means at the rear end of the sleeve, the boom movably mounted through the sleeve and the front and rear boom mounting means and positioned to have a corner of the boom on the bottom and an opposite corner of the boom on the top directly over the bottom corner; the front mounting means having a pair of front, bottom rollers arranged in a v shape to cradle the boom; the front mounting means having a top guide wheel rotatable on a horizontal axis above the bottom rollers and centered with respect to the bottom rollers, the top guide wheel having a groove in its periphery to ride on the top corner of the boom to hold the boom against the bottom rollers;

the rear boom mounting means having a pair of rear, top rollers arranged in an inverted v shape riding on the top portion of the boom, a bottom guide wheel rotatable on a horizontal axis below the top rollers and centered with respect to the top rollers, the bottom guide wheel having a groove in its periphery receiving the bottom corner of the boom, the rear top rollers holding the boom against the bottom guide wheel and boom moving means for moving the boom relative to the boom support, the boom moving means having a single cable generally mounted above, and spaced from, the boom with the ends of the cable attached to the upper ends of the sleeve, the cable passing over cable guide means at the ends of the boom, the cable passing above the sleeve through a cable drive unit, the drive unit mounted on the top of the sleeve and spaced from the boom.

2. A boom unit as claimed in claim 1 wherein the boom moving means has a front guide pulley mounted on top of the front end of the boom; a rear guide pulley mounted on top of the rear end of the boom; the cable fastened at one end to the front of the sleeve, the cable extending forwardly from the front end of the sleeve, up and over the front guide pulley, through the cable drive unit, over and down the rear guide pulley and fastened at its other end to the rear of the sleeve.

3. A boom unit as claimed in claim 1 wherein the cable drive unit has a central drive pulley flanked on one side by a first, central guide pulley and flanked on the other side by a second, central guide pulley, and a motor for rotating the drive pulley in either direction.

4. A boom unit as claimed in claim 1 wherein the boom is a telescopic boom with an outer boom section movably mounted through the front and rear boom mounting means, and an inner boom section movably mounted within the outer boom section and extending forwardly therefrom.

5. A boom unit for a tree processing machine having: a boom with a square cross-section; a boom support in the form of a straight sleeve; front boom mounting means at the front end of the sleeve and rear boom mounting means at the rear end of the sleeve, the boom movably mounted through the sleeve and the front and rear boom mounting means and positioned to have a corner of the boom on the bottom and an opposite corner of the boom on the top directly over the bottom corner; boom moving means for moving the boom relative to the beam sleeve, the boom moving means having a single cable generally mounted above, and spaced from, the boom with the ends of the cable attached to the upper portion of the ends of the sleeve, the cable passing up and over cable guide means at the ends of the boom, the cable passing above the sleeve through a cable drive unit, the drive unit mounted on the top of the sleeve and spaced from the boom.

6. A boom unit as claimed in claim 5 wherein the boom moving means has a front guide pulley mounted on top of the front end of the boom; a rear guide pulley mounted on top of the rear end of the boom; the cable fastened at one end to the front of the sleeve, the cable extending forwardly from the front end of the sleeve, up and over the front guide pulley, through the cable drive unit, over and down the rear guide pulley and fastened at its other end to the rear of the sleeve.

7. A boom unit as claimed in claim 5 wherein the cable drive unit has a central drive pulley flanked on one side by a first, central guide pulley and flanked on the other side by a second, central guide pulley, and a motor for rotating the drive pulley in either direction.

8. A boom unit for a tree processing machine having; a boom support in the form of a straight sleeve; front boom mounting means at the front end of the sleeve and rear boom mounting means at the rear end of the sleeve; a telescopic boom with a square cross-section with an outer boom section movably mounted through the sleeve and the front and rear boom mounting means, and an inner boom section movably mounted within the outer boom section and extending forwardly therefrom; the boom positioned to have a corner of the boom on the bottom and an opposite corner of the boom on the top directly over the bottom corner; boom moving means for moving the boom relative to the sleeve, the boom moving means having a first cable generally mounted above the boom with one end of the cable attached to the outer end of the inner boom member and the other end attached to the sleeve, the cable passing up and over cable guide means at the inner end of the outer boom member, the cable passing above, and spaced from, the sleeve through a cable drive unit mounted on the top of the sleeve, the cable drive unit spaced from the boom; and a second cable attached at one end to the sleeve, passing over and down cable guide means on the front end of the outer boom member and attached at its other end to the inner end of the inner boom member.

9. A boom unit as claimed in claim 8 wherein the cable drive unit has a central drive pulley flanked on one side by a first, central guide pulley and flanked on the other side by a second, central guide pulley, and a motor for rotating the drive pulley in either direction.

10. A boom unit as claimed in claim 8 wherein the cable drive unit is mounted on the sleeve through a shock absorbing unit.

11. A boom unit as claimed in claim 10 wherein the shock absorbing unit comprises: a bottom platform fixed to the sleeve; a top platform, carrying the cable drive unit, overlying the bottom platform but spaced therefrom; pivot means pivotably connecting the top platform about midway along its length to the bottom platform; and shock absorbing members, spaced from the pivot means, mounted between the top and bottom platforms.

12. A boom unit as claimed in claim 5 wherein the cable drive unit is mounted on the sleeve through a shock absorbing unit.

13. A boom unit as claimed in claim 12 wherein the shock absorbing unit comprises: a bottom platform fixed to the sleeve, a top platform, carrying the cable drive unit, overlying the bottom platform but spaced therefrom; pivot means pivotably connecting the top platform about midway along its length to the bottom platform; and shock absorbing members, spaced from the pivot means, mounted between the top and bottom platforms.

14. A boom unit as claimed in claim 8 wherein the cable drive unit is mounted on the sleeve through a shock absorbing unit.

15. A boom unit as claimed in claim 14 wherein the shock absorbing unit comprises: a bottom platform fixed to the sleeve; a top platform, carrying the cable drive Unit, overlying the bottom platform but spaced therefrom; pivot means pivotably connecting the top platform about midway along its length to the bottom platform; and shock absorbing members, spaced from the pivot means, mounted between the top and bottom platforms.

16. A boom unit as claimed in claim 1 wherein the front, bottom and rear, top rollers are each mounted on a spindle with tapered bearings, each spindle mounted by only its bottom end on the sleeve to have the spindle extending freely upwardly thereby simplifying bearing maintenance and replacement.

17. A boom unit as claimed in claim 4 wherein the front, bottom and rear, top rollers are each mounted on a spindle with tapered bearings, each spindle mounted by only its bottom end on the sleeve to have the spindle extending freely upwardly thereby simplifying bearing maintenance and replacement.

* * * * *